Feb. 8, 1938.  E. P. LARSH  2,107,795
ENGINE PISTON
Filed Nov. 15, 1935
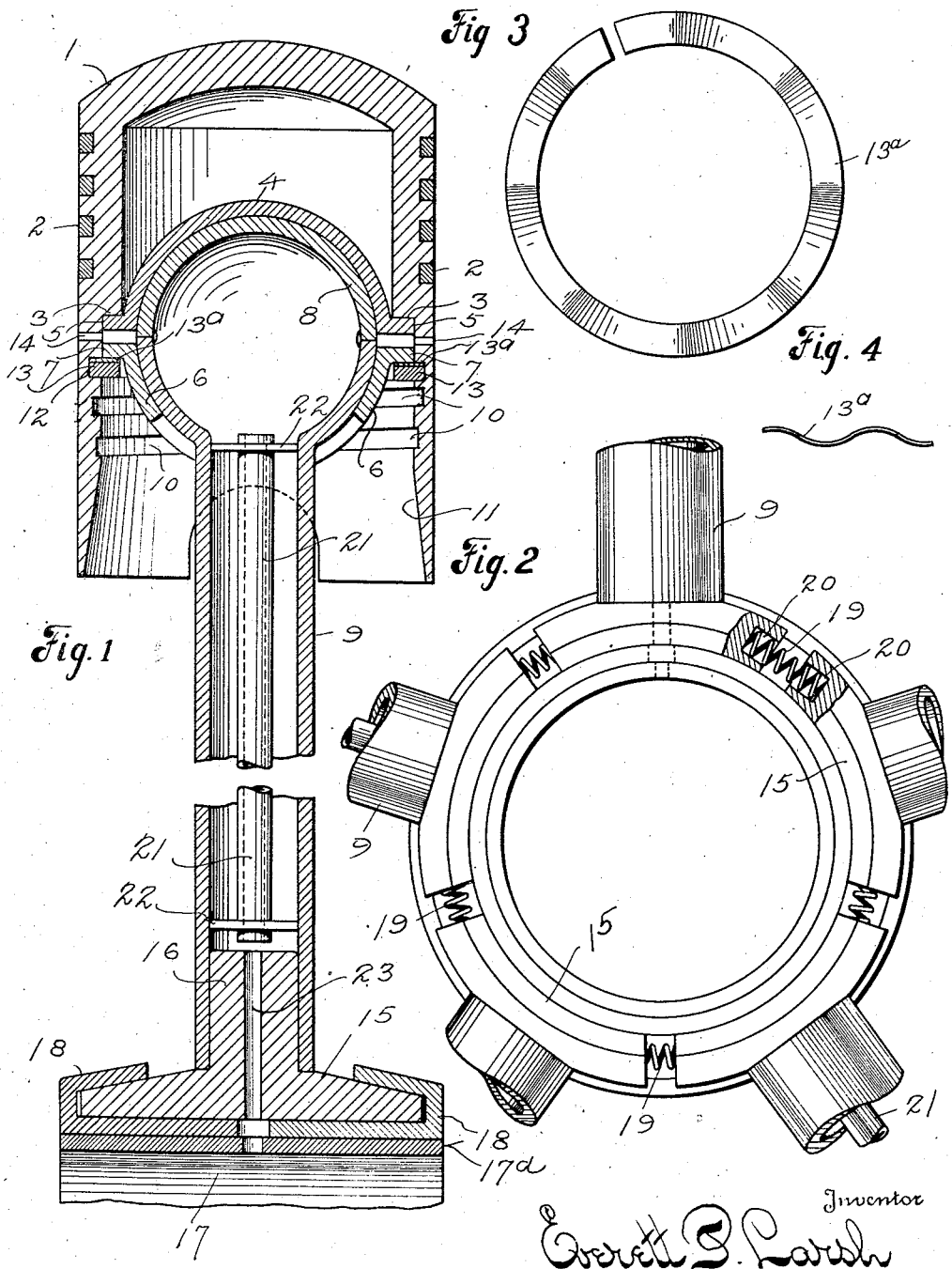
Inventor
Everett P. Larsh
By Walker and Dybvig
Attorney Patented Feb. 8, 1938

2,107,795

UNITED STATES PATENT OFFICE 2,107,795

ENGINE PISTON

Everett P. Larsh, Vandalia, Ohio, assignor to The Master Electric Corporation, Dayton, Ohio, a corporation of Ohio Application November 15, 1935, Serial No. 49,988

21 Claims. (Cl. 309—20)

This invention relates to engines and more particularly to engine pistons and connecting rods.

While it is recognized that a ball and socket type of universal connection between a piston head and its connecting rod is broadly quite old and well known in this art, the present invention pertains to structural features and arrangement of parts which adapt such type of construction to present day needs and economies of commercial production. The ball and socket type of connection possesses some inherent fundamental advantages which render it especially desirable for high compression engines of the hydro-carbon fuel type and especially for Diesel style engines.

The usual wrist pin type of piston and connecting rod assembly necessitates unequal distribution of material throughout the piston head in order to provide bearing lugs for the pin of ample size. As usually constructed such piston heads embody relatively large masses of material at diametrically opposite points. Such unequal distribution of metal not only materially increases the weight of the piston head but also causes unequal expansion and contraction under thermal change necessitating in some instances that the piston be made eccentric or out of round so that as it unequally expands under increase of temperature it may assume true cylindrical form.

Furthermore in the use of the customary wrist pin type of connection, the thrust pressure is concentrated upon a relatively small surface of the pin transversely of the piston head whereas the present ball and socket type of connection affords a relatively large concentric area over which the thrust pressure is uniformly distributed in equalized relation with the piston.

As heretofore constructed ball and socket type piston and connecting rod assemblies have been expensive and difficult to accurately manufacture in quantity production. They have heretofore also involved difficult problems of assembly and maintenance.

The present construction is designed to overcome the existing objections to ball and socket type of piston and connecting rod assembly while retaining the advantageous features thereof.

The object of the invention is to improve the construction of engine piston and connecting rod assemblies whereby they may not only be economically manufactured, but will be more efficient in use, of maximum strength and increased durability, and unlikely to need repair.

A further object of the invention is to provide a piston head which will be uniformly susceptible to expansion and contraction under variations of temperature, and hence at all times accurately fitting the cylinder.

A further object of the invention is to provide a thrust bearing of relatively large size, the parts of which may be conveniently and inexpensively manufactured by present production methods and which may be readily assembled and disassembled by unskilled mechanics.

A further object of the invention is to provide an improved form of connecting rod of hollow tubular construction and to provide a hollow spherical head therefor adaptable for modern mass production methods.

A further object of the invention is to provide improved detent means for holding the thrust bearing parts in assembly.

A further object of the invention is to provide an improved crank shaft bearing construction adaptable for multiple radial connecting rods operating in substantially a single plane.

A further object of the invention is to provide a piston and connecting rod assembly possessing the advantageous structural features, and meritorious characteristics herein mentioned.

A further object of the invention is to provide an improved method of production of piston connecting rod parts and method of assembly thereof.

With the above primary and other incidental objects in view as will more fully appear in the specification, the invention consists of the features of construction, the parts and combinations thereof, the mode of operation or their equivalents as hereinafter described and set forth in the claims.

Referring to the drawing wherein is shown the preferred, but obviously not necessarily the only form of embodiment of the invention, Fig. 1 is a longitudinal sectional view of a piston and connecting rod assembly. Fig. 2 is a side elevation partly in section of the crank shaft bearing portions of a group of radial connecting rods. Fig. 3 is a plan view of a shim which may be employed to produce conformity between the connecting rod head and the socket therefor. Fig. 4 is an elevation of the shim shown in Fig. 3.

Like parts are indicated by similar characters of reference throughout the several views.

Referring to the drawing, 1 is the piston head the cylindrical walls of which are circumferentially of uniform thickness, although of varying thickness longitudinally. Such piston head will tend to expand and contract uniformly. The piston head is provided with the usual sealing rings 2 seated in peripheral grooves. The piston head 1 is provided at midlength with an internal rabbet formed by a shoulder 3. Seated against the shoulder 3 is a semi-spherical socket member 4, having a peripheral flange 5 engaging the shoulder 3. This socket member is stamped from sheet metal of suitable thickness and strength. The thickness and strength of the material may vary according to the conditions of use and size and capacity of the engine and developed pressures to which the piston is subjected. The thrust bearing provided by the socket member 4 is substantially equal to the internal diameter of the piston head 1. Associated with the member 4 is a complementary socket member 6 of annular truncated spherical form, also provided with an annular flange 7 extending within the internal rabbet in proximate relation with the flange 5 of the socket member 4. Interposed between the bearing members 4 and 6 is the hollow spherical head 8 of a tubular connecting rod 9.

The skirt of the piston head 1 is provided with a helical groove 10 beneath which the piston skirt is tapered or flaring as at 11. The helical groove 10 leads into an internal planar groove 12 of somewhat greater depth than the helical groove 10. The socket members are held in assembled relation within the piston head with the head 8 of the connecting rod interposed therebetween by a split ring 13 seated in the planar groove 12. This ring is insertable therein by a screwing action through the helical groove 10. By forcing the split ring into the tapered extremity 11 of the piston skirt it is diametrically contracted sufficiently to enter the helical groove 10 wherein it will assume a corresponding helical shape with its ends in slightly overlapping relation. In such condition it may be rotated within the helical groove until it passes therefrom into the planar groove 12. This groove being of greater depth, the ring will expand therein with a snap action and will retain its position therein to prevent displacement of the socket members 4 and 6. These socket members conform accurately to the spherical head 8 of the connecting rod, but are so proportioned that their flanges 5 and 7 do not normally contact, but are separated by a small clearance space which permits the socket member 6 to conform closely to the head of the connecting rod. This space also permits entrance to the connecting rod bearing of lubricant supplied through radial oil ducts 14. To insure that the socket members shall conform at all times to the connecting rod head, shims 13a as may be necessary are interposed between the retaining ring 13 and the flange 7 of the annular socket member. In lieu of shims a corrugated spring collar as shown in Fig. 3 may be utilized. The resiliency of such spring collar will automatically compensate for wear and insure a close fit of the connecting rod head in its socket bearing at all times.

The connecting rod 9 is of tubular material, one end of which is expanded into semispherical shape to form an integral portion of the connecting rod 8. Welded to such expanded extremity of the tubular connecting rod is a semi-spherical cap portion which completes the head 8 of the connecting rod. This spherical extremity is accurately ground to size to fit the socket members 4 and 6. At its opposite end the tubular connecting rod may be formed with the conventional annular split head to fit the crank shaft bearing. However in the drawing the connecting rod is shown provided with a segmental bearing shoe 15 to which the tubular stem is welded.

As shown in Fig. 2 the segmental bearing shoe enables multiple connecting rods to be connected with the same crank shaft bearing for operation in the same plane. This is of especial advantage in engine designs embodying radially disposed multiple cylinders.

The crank shaft bearing shoes 15 are preferable forgings each of which includes a shank portion 16 extending within the end of the tubular rod 9, and a segmental head the lateral portions of which are formed with beveled faces, and the inner face of which is of arcuate contour concentric with the crank shaft 17. The several connecting rod shoes are held in assembled relation about the crank shaft by recessed collars 18, preferably of bronze, disposed on opposite sides of the several connecting rods. The inner sides of the recessed retaining rings extend intermediate the crank shaft and the connecting rod shoes from opposite sides and afford in effect a bushing for the assembly of connecting rods within which the crank shaft 17 rotates.

The outer sides of the recessed retaining rings overhang the opposite beveled outer faces of the shoes 15 and hold the several rods in operative relation with the crank shaft. The crank shaft rotates within the rings 18, but the rods have a limited to and fro movement circumferentially of the rings and relative to each other as the several connecting rods reciprocate and the crank shaft rotates.

To maintain substantially equal spacing of the several connecting rods, helical springs 19 may be interposed between the adjacent bearing shoes 15 which are provided with sockets or seats 20 to receive the ends of such springs. In the event the engine is provided with force feed lubrication, an oil conduit 21 may be axially supported within the tubular connecting rod by spacer collars 22. The tubular conduit 21 communicates with a passage 23 in the bearing shoe 15 through which oil is conducted from the crank shaft bearing. At its upper end the oil conduit 21 communicates with the interior of the spherical head 8 which may be provided with small oil ports through which oil may be supplied to the connecting rod head bearing in the socket members 4 and 6.

The helical groove 10 of the piston head is preferably, although not necessarily of gradually increasing depth merging at its outer end with the surface of the flaring interior of the skirt portion and merging at its inner end into the planar groove 12. The radial expansion of the split ring 13 as it passes under tension through the helical groove and into the planar groove effectively prevents its return movement while in use. The ring may be readily removed by drawing one end thereof at the split downwardly into helical form and entering it into the contiguous portion of the helical groove, whereupon the ring may be rotated under compressive tension by an unscrewing movement through the groove 10 into the outer flaring portion of the piston head. Such flare of the piston skirt conveniently enables initial compression of the expansible split ring sufficiently to enter it into the helical groove 10. This construction affords a highly efficient means for retaining the parts in assembly, but which may be economically manufactured and quite readily installed and removed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. A hollow piston head open at one end, the interior of the open end being tapered, an internal circumferential rabbet therein, an internal circumferential planar groove therein, spaced from the rabbet toward the open end of the piston head, and an internal helical groove leading from the internal tapered area to the internal circumferential planar groove.

2. In an engine piston, a hollow piston head including a skirt portion, a circumferential rabbet within the skirt portion of the piston, an internal circumferential groove in the head in spaced relation with the rabbet, a split retaining ring seated in the groove, a pair of reversely arranged concentric hollow spherical bearing members including peripheral flanges interposed between the retaining ring and rabbet, one of the bearing members being truncated, a connecting rod including a spherical head enclosed between the spherical bearing members, a helical groove interiorly of the skirt portion of the piston head of less depth than the retaining ring groove leading thereto, the skirt of the piston head being interiorly tapered contiguous to the entrance end of the helical groove.

3. In an engine piston, a hollow piston head including a skirt portion, an internal circumferential rabbet in such skirt portion, a planar groove in spaced relation with the rabbet, a pair of hollow spherical bearing members concentrically arranged in reverse relation the diameters of which are substantially equal to the interior diameter of the hollow piston, one of which is truncated, peripheral flanges on the spherical bearing members overhanging the internal rabbet, retaining means engageable with the planar groove for removably securing the bearing members in assembled relation with the piston head, a connecting rod and a spherical head therefor enclosed between the bearing members.

4. The combination with a hollow piston head and a connecting rod having a spherical head, of a pair of complementary hollow spherical bearing members, one of which is truncated, of uniform thickness throughout, to enclose the spherical connecting rod head, flat peripheral flanges on the bearing members registering with each other when said members are engaged with the connecting rod head, an abutment surface within the piston head engaged by a flange of one of said members, a planar groove within the piston and spaced from the abutment, and means including a split ring engageable with the planar groove for retaining the bearing members, piston head and connecting rod in assembled relation.

5. A piston and connecting rod assembly, including a hollow piston head having walls of substantially uniform mass peripherally, whereby the head will have substantially uniform expansion and contraction in response to thermal change, a concavo-convex semi-spherical diaphragm peripherally engaged with the piston head walls and forming a thrust seat for a connecting rod, a connecting rod including a spherical head seated within the concavo-convex diaphragm, a concavo-convex retaining collar of truncated spherical form peripherally engaged with the piston head walls in opposing relation with the spherical diaphragm and maintaining the connecting rod head therebetween, a planar groove within the piston, and a retaining ring engageable therewith and with the retaining collar for maintaining the diaphragm and the retaining collar in assembly.

6. As an article of manufacture, a piston, a bearing socket therein including a substantially semi-spherical bearing member of substantially uniform thickness throughout, including a planar peripheral flange formed integral therewith, and a complementary bearing member comprising a collar of truncated spherical shape of substantially uniform thickness throughout having a planar peripheral flange formed integral therewith, said members coacting to form a bearing socket, a ball headed connecting rod engageable therein, a planar groove in the piston head in which the planar peripheral flanges of the bearing members are disposed in operative position, and a ring member engageable in the planar groove to retain the parts in assembled relation.

7. As an article of manufacture, a hollow piston head having an interiorly flaring skirt portion, an internal circumferential rabbet in spaced relation with the flaring skirt portion, an internal circumferential planar groove in spaced relation with the rabbet, and a helical groove leading from the flaring skirt portion to the internal circumferential groove, a bearing member removably positioned between the rabbet and groove, and a retaining ring engageable in the groove for securing the bearing members and a connecting rod including a head engageable in said bearing members.

8. In combination, a hollow piston head open at one end, an internal circumferential rabbet and an internal circumferential planar groove therein, the groove being spaced from the rabbet toward the open end of the piston head, an internal helical groove leading from the circumferential planar groove toward the open end of the piston head, a removable connecting rod bearing within the head, a retaining member therefor introducible through the helical groove into the planar groove for cooperation with the rabbet as a connecting rod bearing holding means, and a connecting rod engageable in said bearing.

9. In combination, a hollow piston head open at one end, an internal circumferential planar groove therein, an internal helical groove leading from the circumferential planar groove toward the open end of the piston head, a removable connecting rod bearing within the head, a retaining member therefor introducible through the helical groove into the planar groove, and a connecting rod engageable in said bearing.

10. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells, a retaining member therefor introducible through the helical groove into the planar groove, and a connecting rod engageable in said bearing.

11. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells, a split ring retaining member therefor introducible through the helical groove into the planar groove, and a connecting rod engageable in said bearing.

12. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells of uniform thickness throughout, a retaining member therefor introducible through the helical groove into the planar groove, and a connecting rod engageable in said bearing.

13. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells of uniform thickness throughout, and one of which is truncated, a retaining member therefor introducible through the helical groove into the planar groove, and a connecting rod engageable in said bearing.

14. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells of uniform thickness throughout, a retaining member therefor introducible through the helical groove into the planar groove, and a connecting rod having a spherical head enclosable between the bearing shells.

15. In combination, a hollow piston head open at one end, an internal circumferential planar groove therein, an internal helical groove leading from the circumferential planar groove toward the open end of the piston head, a removable connecting rod bearing including complementary semi-spherical connecting rod bearing shells of uniform thickness throughout, a retaining member therefor introducible through the helical groove into the planar groove, and a tubular connecting rod having a hollow spherical head engageable between the bearing shells.

16. In combination, a hollow piston head open at one end, an internal circumferential planar groove therein, an internal helical groove leading from the circumferential planar groove toward the open end of the piston head, a removable spherical socket forming a connecting rod bearing, a retaining member therefor introducible through the helical groove into the planar groove, and a tubular connecting rod having a hollow spherical head engageable in the socket.

17. In combination, a hollow piston head open at one end, an internal circumferential planar groove therein, a removable connecting rod bearing within the head, a collapsible and expansible retaining member therefor engageable in the planar groove, and a connecting rod engageable in said bearing.

18. In combination, a hollow piston head open at one end, an internal circumferential planar groove therein, a removable connecting rod bearing within the head, a collapsible and expansible split ring retaining member therefor engageable in the planar groove, and a connecting rod engageable in said bearing.

19. In combination, a hollow piston head open at one end, an internal circumferential planar groove therein, a removable connecting rod bearing within the head, a collapsible and expansible retaining member therefor engageable in the planar groove, and a tubular connecting rod having a hollow spherical head engageable in the bearing.

20. In combination, a hollow piston head open at one end, an internal circumferential planar groove therein, a removable connecting rod bearing including complementary semi-spherical bearing shells, a collapsible and expansible retaining member therefor engageable in the planar groove, and a tubular connecting rod having a hollow spherical head engageable between the connecting rod bearing shells.

21. In combination, a hollow piston head open at one end, an internal circumferential planar groove therein, an internal helical groove leading from the circumferential planar groove toward the open end of the piston head, a pair of semi-spherical bearing shells having integral flat flanges thereon, a bearing ledge within the piston against which the flange of one of the bearing shells abuts, the flange of the other bearing shell being adapted to lie concentric to the flange of the first named bearing shell, a retaining member introducible through the helical groove for retaining the flange of one bearing shell in abutting relation with the ledge and the flange of the other shell in juxtaposed concentric relation therewith, and a connecting rod engageable in said bearing.

EVERETT P. LARSH.